United States Patent [19]
Rice et al.

[11] 3,718,172
[45] Feb. 27, 1973

[54] METHOD OF FORMING A THERMALLY INSULATED COMPOSITE ARTICLE

[75] Inventors: Hal H. Rice, James C. Holzwarth, both of Birmingham, Mich.

[73] Assignee: General Motors Corporation, Detroit, Mich.

[22] Filed: July 16, 1971

[21] Appl. No.: 163,324

[52] U.S. Cl. ......................164/75, 164/76, 164/98, 138/143
[51] Int. Cl. ..........................B22d 19/08, F16l 9/16
[58] Field of Search .............164/98, 75, 76; 138/143

[56] References Cited

UNITED STATES PATENTS

| | | | |
|---|---|---|---|
| 2,047,778 | 7/1936 | Hayden | 138/143 |
| 2,616,408 | 11/1952 | Twells | 138/143 X |
| 3,129,727 | 4/1964 | Tanaka | 138/143 |
| 3,173,451 | 3/1965 | Slayter | 164/98 UX |

*Primary Examiner*—Robert D. Baldwin
*Attorney*—Frank J. Soucek et al.

[57] ABSTRACT

A method of forming a thermally insulated composite article having an inner core surrounded by a cushioning layer and an outer shell. The core member, including at least one continuous inner surface defining a fluid passage therethrough, is either cast or formed from a block of erosion resistant high impact material. The inner surfaces of the core are then coated with a granulated or powdered material which is fused forming an impervious layer and the outer core surfaces are covered with a layer of refractory cushioning material. Finally a metal shell is applied over the cushioning layer to complete the composite article.

16 Claims, 3 Drawing Figures

PATENTED FEB 27 1973  3,718,172

INVENTORS
Hal H. Rice, &
BY James C. Holzwarth
C. R. Engle
ATTORNEY

METHOD OF FORMING A THERMALLY INSULATED COMPOSITE ARTICLE

This invention relates to a method for forming thermally insulated composite articles capable of conducting high temperature fluids therethrough with a minimum heat loss to a metal outer shell confining a core of high impact material. More specifically this invention relates to a process for making a composite fluid conducting article wherein a ceramic core conducting the fluid is cushioned from a metal outer shell by a layer of resilient refractory material allowing shrinkage of the metal or shock loading by the fluids within the core without damaging the core during use of the article.

Heretofore many processes have been developed wherein a refractory or ceramic core is cast within a metal outer shell or the refractory core has been formed and the metal cast thereabout. In such processes the metal engages the pores of the refractory core and adheres thereto to provide a rigid composite structure. In the normal course of use of such a composite article, for example, in a vehicle manifold system any shock loads applied to the outer shell are directly transmitted to the refractory or ceramic core frequently resulting in fracturing thereof. Accordingly, it is a purpose of this invention to provide a rigid ceramic core that is cushioned from a metal shell containing or encapsulating the core. The cushioning layer can readily be applied prior to casting the metal about the ceramic core with the thickness thereof being a factor of the length of the article being fabricated.

Among the objects of this invention is the provision of a process including the steps of forming a rigid core defining a fluid conducting passage, coating the outer surface of said core with a layer of cushioning material, and casting a metal shell thereabout.

Another object of this invention is the provision of a process of manufacture including machining a ceramic core member from a rigid block of foamed ceramic silicate material, wrapping a layer of fibrous aluminum silicate thereon to provide a cushioning layer on the outer surface, and casting a metal shell about the cushioning layer enclosing the core.

A still further object of this invention is the provision of a process of forming a ceramic core disposed within a cast outer shell having a cushioning layer therebetween and including a coating of impervious material on the inner surfaces of the ceramic liner preventing fluids passing therethrough from gaining entrance into the material of the core.

Another object of this invention is the provision of a method of forming a thermally insulated fluid conducting composite article including forming a ceramic fused silica foamed core in components, joining the components with a refractory cement, coating the outer surfaces of the core assembly with a cushioning material at a specified thickness according to the length of the core, and casting a metal confining shell thereabout.

Other objects and advantages of this invention will be apparent from the following detailed description of preferred embodiments thereof.

IN THE DRAWINGS

Figure 1:
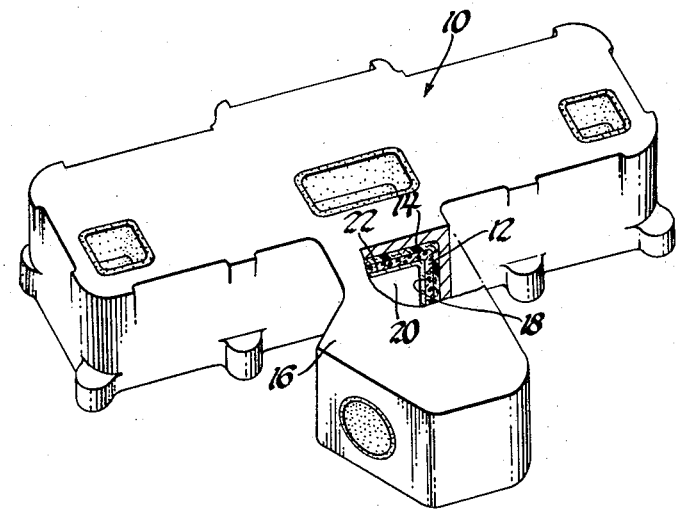
FIG. 1 is a perspective view of the thermally insulated composite article with a portion cut away illustrating the relationship between the core, the cushioning layer, and the metal outer shell.

With reference to FIG. 1, a thermally insulated composite article 10, which for purposes of illustration is a vehicle exhaust manifold, includes a core 12 of erosion resistant material with a layer of cushioning material 14 on its outer surfaces. A metal shell 16 is cast about the core and the cushioning layer to complete the composite article 10.

The core 12 can be formed by conventional methods including machining it to a desired form from a rigid block of ceramic foam material such as fused silica foam or it can be cast from a 95 percent beta spodumene-5 percent clay foam mixture. When the core is formed by a casting operation, the raw materials are mixed with foaming agents and are poured into a mold or container of a predetermined shape and liner wall thickness. The core is removed from the mold after foaming agents and green strength additives have reacted. The core is then fired to a rigid structure. The production of the core assembly in this manner is of course accomplished by well-known techniques. While use of a rigid ceramic foam material such as fused silica foam or the 95 percent beta spodumene-5 percent clay foam mixture are specifically referenced for use in forming the core 12, it is of course appreciated that other erosion resistant materials providing an acceptable heat transfer factor between a fluid flowing within the core and the metal outer shell could be used to obtain desired thermal insulation characteristics.

After the rigid ceramic core 12 is prepared, the inner surfaces 18 defining a fluid passage 20 are coated with a layer of dense material 22 which is impervious to the fluids flowing through passage 20. This prevents the entrance of any materials, carried by the fluid, into the porous ceramic core material and eroding it away while the composite article is in use. When the core 12 is formed of fused silica foam, the inner surface 18 is coated with a powdered or granulated fused silica layer so that the surface pores of the rigid silica foam are completely filled. The powdered or granulated silica material forming the layer 22 is disposed within the surface pores of inner surfaces 18 and is then fused into the inner surfaces 18 with an intense heat such as by inserting an oxyacetylene torch within the passage 20 and moving it at a rate whereby the surface is heated sufficiently to fuse the granulated material into the pores providing the impervious layer of dense material 22. When the core 12 is formed of 95 percent spodumene-5 percent clay foam, the impervious layer of dense material 22 is accomplished by flooding the interior surface with a spodumene slip to fill the pores and then firing the sealed piece in a furnace at 2300° F. for a period of 10 minutes. The fired piece is removed from the furnace and is then air cooled.

Figure 2:
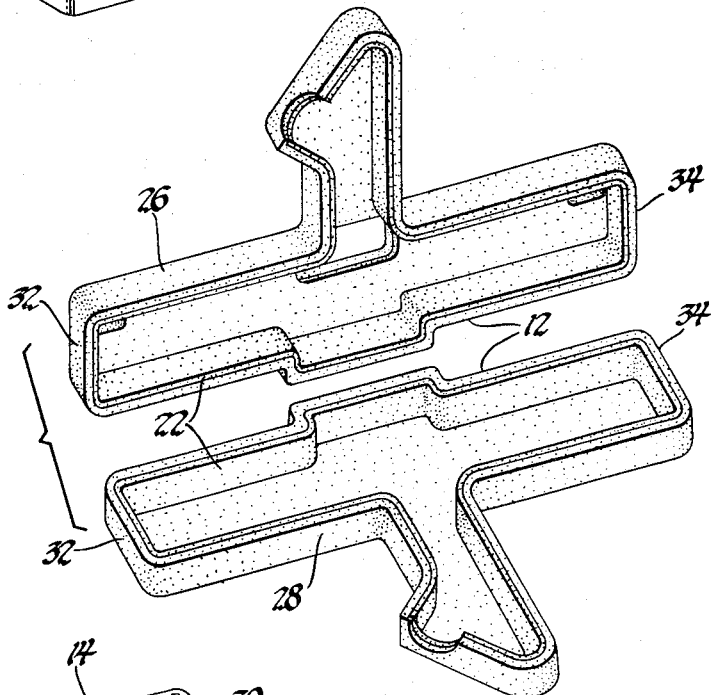
FIG. 2 is a perspective view showing the ceramic core formed in two portions prior to being adhered together.
Figure 3:
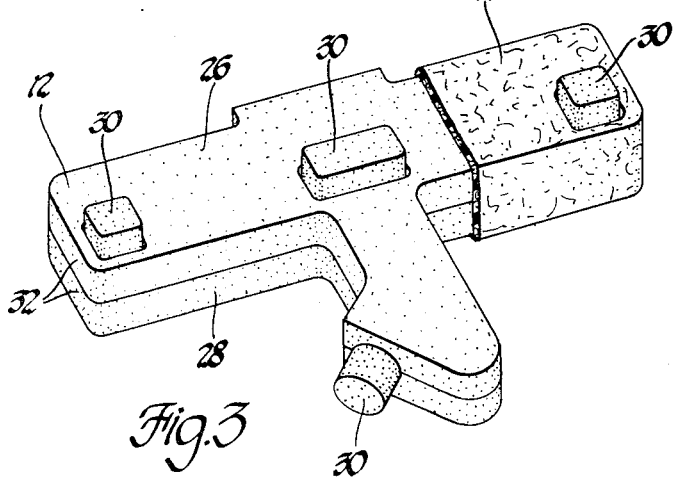
FIG. 3 is a perspective view illustrating portions of the ceramic core adhered with a sand core contained therein and a cushioning layer applied to the outer surfaces.

The preferred method of making an intricate core concerns a process related to the structure shown in FIG. 2, wherein the core 12 is initially formed in two halves 26 and 28. Of course it is apparent that the core could be formed from any number of intricate parts and joined together by a suitable refractory cement such as fused silicas or an aluminum silicate. After the component halves 26 and 28 have been formed, a sand core 30 is placed within the components and they are cemented together enclosing the core as illustrated in FIG. 3. The core assembly 12 containing the sand core 30 is then covered with a layer of resilient ceramic material forming cushioning layer 14. A preferred composition of the cushioning material constitutes a fibrous aluminum silicate paper material. The layer of cushioning material 14 can be applied to the outer surfaces of the core 12 by wrapping the paper around the core 12 until its outer surfaces are completely covered. While this is one method of applying the resilient fibrous aluminum silicate material to the outer surfaces of the core, disclosure of such is not intended to limit the scope of this process. For example, the fibrous aluminum silicates could be applied by other means such as by mixing with a liquid vehicle and spraying onto the outer surfaces of the core, or by applying a tacky substance, for example, sodium silicate silicate or ethyl silicate to the hard foam ceramic core 12 and then blowing macerated fibers or flock against the outer surface.

The layer of cushioning material 14 is applied to prevent cracking or fracturing of the low expansion ceramic core 12 due to the relatively high solidification shrinkage and thermal contraction rate of the cast iron or aluminum metal when the shell 16 is cast thereabout. Thermal contraction of the cast iron or aluminum as it solidifies around the core results in a predetermined shrinkage of the metal upon the core 12. If the layer of cushioning material 14 is of sufficient thickness it will absorb shrinkage of the metal preventing damage to the core. A further advantage of utilization of the layer of cushioning material 14 is that it also prevents the rigid ceramic shell from being subjected to high stress imposed by the metal jacket during use of the composite assembly, such as the manifold being installed on a vehicle engine. The layer of cushioning material also prevents the ceramic core 12 from direct impact engagement with the metal shell should the fluid flowing through passage 20 for some reason encounter a pressure surge or a high impact loading condition such as during a vehicle engine backfire condition.

In order to provide satisfactory cushioning between the core 12 and the metal shell 16 it is necessary to precisely control the thickness of the layer of cushioning material 14. To accomplish this result the thickness of the layer of cushioning material must correlate with the thermal contraction of the particular metal being cast about the core. The usual shrinkage rate of cast iron is about one-eighth inch per foot, therefore it is necessary to vary the thickness of the resilient cushioning layer in accordance with the length of the composite cast article being formed. Obviously if the cushioning layer is too thin the core will be crushed when the metal shrinks and if the layer is too thick then the ceramic core will not be firmly supported within the metal shell after cooling so that it would fracture during relatively severe operational shock loads. In situations where the core assembly 12 is of a form including closed ends 32 and 34, it is necessary to provide sufficient cushioning on these end surfaces so that the shrinkage of the metal shell 16 will not compress and fracture the core assembly. It has been found that a layer of cushioning material 14 having a thickness of about 0.180 inches per lineal foot of length of the core assembly will be effective. This rate of thickness is adequate whether the metal is cast iron or an aluminum alloy.

Subsequent to the application of the layer of cushioning material 14, the ceramic core assembly 12 containing the sand core 30 is suitably supported within a sand or permanent mold by providing core print areas in the mold or by supporting the assembly on conventional chaplets. The metal is then poured into the mold in the usual manner and after solidification the mold is broken away to remove the composite assembly 10. After removal from the mold the sand core 30 is removed from the composite article 10 by heating the article at 600° F. for five hours to decompose the organic core binder. The sand is then shaken out of the fluid passage 20 and the casting flash is removed by usual methods. Of course, if it is desired to provide valve seats or wear resistant surfaces around ports in the composite article, inserts of stainless steel sheet metal may be incorporated into the composite mold around the ports during the casting operation. In the situation where no inserts are used in the casting, the exposed cushioning material 14 in the areas of the ports can be faced with refractory cement, i.e. a fused silica or aluminum silicate used to join the components of the core 12.

This invention constitutes a process providing a composite metal ceramic article having a cushioning layer between a ceramic core member and a metal outer shell member which provides an advanced result in the art. Therefore, the above description is for purposes of illustration only and is not intended to limit the scope of this invention except as required by the following appended claims.

I claim:

1. A method of forming a composite article having an inner core surrounded by a cushioning layer and an outer shell comprising the steps of forming said core member of erosion resistant ceramic material, said material being in the form of a core having at least one continuous inner surface defining a fluid passage therethrough, coating the inner surface of said core with an impervious material, cushioning the exterior surface of said core member with a layer of an insulating material, and casting metal about said exterior layer to form the shell thereof.

2. The process as described in claim 1 wherein said core member is machined from a block of rigid ceramic foam material.

3. The process as described in claim 1 wherein said core is machined from a rigid block of fused silica foam.

4. The process as described in claim 1 wherein said core member is formed by mixing a 95 percent beta spodumene-5 percent clay and foaming agents solution and pouring it into a mold of a predetermined shape, allowing the foaming agents to react, removing the formed core from the mold, and firing the core to a rigid structure.

5. The process as described in claim 3 wherein the coating of the inner surface of said core with an impervious material is accomplished by the steps of filling the surface pores with a powdered silica material and fusing the filled surface layer with intense heat by moving an oxysacetylene flame at a prescribed rate along the interior of said core.

6. The process as described in claim 1 wherein the cushioning of said core member from said metal shell is accomplished by wrapping the outer surfaces of said core with a layer of resilient refractory material.

7. The process as described in claim 1 wherein said core is cushioned from said metal outer shell by applying a tacky sodium silicate substance to the outer surface of said core and blowing macerated fibers of aluminum silicate against the outer surface until a layer of a desired thickness is formed.

8. The process as described in claim 1 wherein said outer metal shell is formed by placing said core with its cushioning layer thereon in a mold and pouring molten cast iron thereabout.

9. The process as described in claim 1 wherein said metal outer shell is formed by placing said core with its cushioning layer thereon within a mold and pouring an aluminum alloy thereabout.

10. The process as described in claim 4 wherein coating the inner surface of said core with an impervious material is accomplished by the steps of flooding the interior surface with a spodumene slip filling the pores in the surface, placing the core in a furnace, firing the core at 2300° F. for a period of ten minutes, and removing the core from the furnace.

11. A method of forming a thermally insulated composite fluid conducting article comprising the steps of: mixing raw ceramic material and foaming agents; pouring the mixture into a mold of predetermined shape and core wall thickness; removing said core from the mold after the foaming agents have reacted; firing the core component to a rigid structure; applying a dense layer of powdered ceramic material to the inner surfaces of said core, said dense layer being impervious to penetration and being resistant to erosion by fluids passing through said passage; coating the outer surfaces of said core with a cushioning layer of resilient fibrous aluminum silicate material; positioning the coated ceramic core in a mold cavity; pouring a molten cast iron into said cavity forming a metal covered thermally insulated composite fluid conducting article whereby said ceramic core is protected from shrinkage of the cast metal and operational shocks to said metal cover by said cushioning layer.

12. A method of forming a thermally insulated fluid conducting composite article comprising the steps of forming a block of fused silica ceramic foam, machining the block in the form of a component of a ceramic core having inner surfaces defining a portion of one fluid passage, applying a dense layer of powdered fused silica material to the inner surfaces of at least two of said core portions defining the fluid passage, said dense layer being impervious to penetration and being resistant to erosion by fluids passing through said passage when said portions are assembled, joining the rigid ceramic core portions with a refractory cement such as aluminum silicate forming an intricate core structure, coating the outer surfaces of said assembled core with a cushioning layer of resilient fibrous aluminum silicate material, positioning the coated ceramic core assembly in a mold cavity, and pouring a molten aluminum alloy into said cavity forming a metal covered ceramic fluid conducting article whereby said ceramic core is protected from cast metal shrinkage and operational shocks by said cushioning layer.

13. The process as described in claim 2 wherein said cushioning layer formed on the outer surface of said liner is in the range of 0.120 – 0.200 inches in thickness per lineal foot of the liner.

14. A method of fabricating a thermally insulated composite fluid conducting article comprising the steps of forming a block of fused silica ceramic foam, machining the block in the form of a ceramic core half having an inner surface defining at least one-half of one fluid passage and at least one-half of one inlet and one outlet port, applying a dense layer of fused silica material to the inner surfaces of said liner half, said dense layer being impervious to penetration and resistant to erosion of fluids passing through said passage, positioning said core halves upon a preformed sand core, cementing the core halves together about said sand core with a refractory cement forming an intricate core structure, coating the outer surfaces of said core with a cushioning layer of resilient fibrous aluminum silicate material, positioning the coated ceramic core with the sand core therein in a mold cavity, pouring a molten aluminum alloy into said cavity forming a metal covered thermally insulated composite fluid conducting article whereby said ceramic core is protected from metal shrinkage and operational shocks by said cushioning layer, removing said thermally insulated composite article from the mold, and heating the composite article to 600° F. for five hours to decompose the sand core within said core.

15. The method as described in claim 14 further comprising the step of facing exposed cushioning material around said inlet and outlet ports with a refractory cement such as aluminum silicate.

16. The method as described in claim 14 further comprising the step of placing metal inserts around said inlet and outlet ports, the inserts being molded into said metal cover.

* * * * *